No. 823,869. PATENTED JUNE 19, 1906.
W. P. HUSSEY.
SPACER AND HOLDER FOR HEATING PIPES.
APPLICATION FILED JULY 13, 1905.
2 SHEETS—SHEET 1.
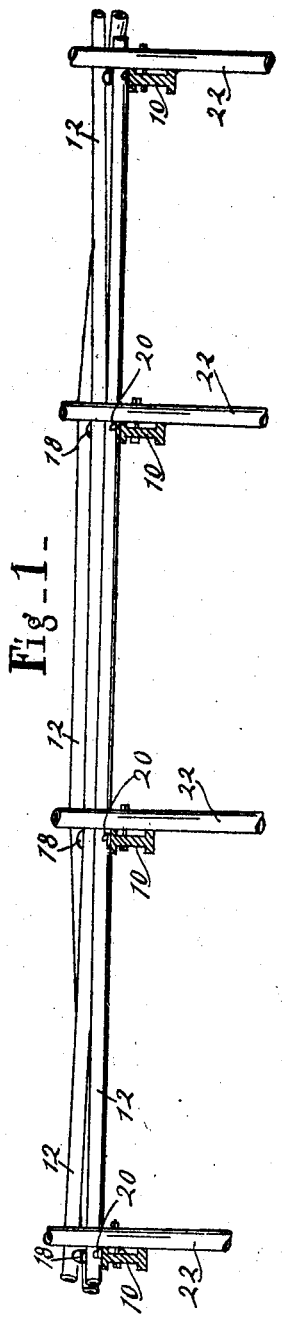
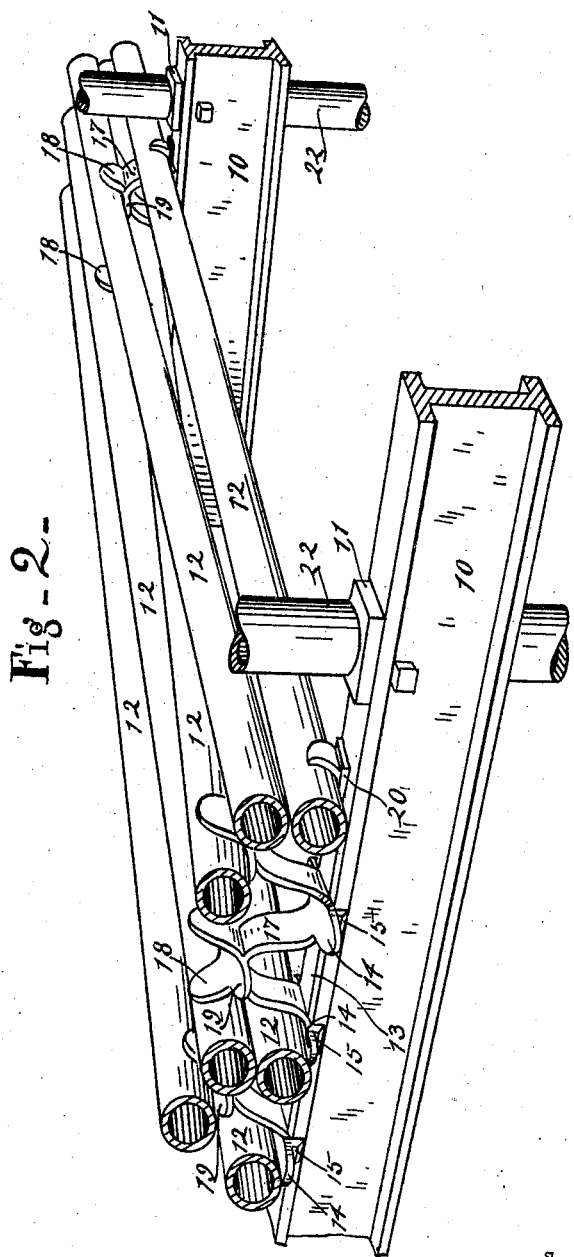
Witnesses
W. M. Gentle
N. Allemong
Inventor
William P. Hussey.
By V. H. Lockwood
Attorney No. 823,869. PATENTED JUNE 19, 1906.
W. P. HUSSEY.
SPACER AND HOLDER FOR HEATING PIPES.
APPLICATION FILED JULY 13, 1905.

2 SHEETS—SHEET 2.

UNITED STATES PATENT OFFICE.

WILLIAM P. HUSSEY, OF INDIANAPOLIS, INDIANA, ASSIGNOR TO STANDARD DRY KILN COMPANY, OF INDIANAPOLIS, INDIANA, A CORPORATION OF INDIANA.

SPACER AND HOLDER FOR HEATING-PIPES.

No. 823,869.      Specification of Letters Patent.      Patented June 19, 1906.

Application filed July 13, 1905. Serial No. 269,568.

*To all whom it may concern:*

Be it known that I, WILLIAM P. HUSSEY, of Indianapolis, county of Marion, and State of Indiana, have invented a certain new and useful Spacer and Holder for Heating-Pipes; and I do hereby declare that the following is a full, clear, and exact description thereof, reference being had to the accompanying drawings, in which like figures refer to like parts.

The object of this invention is to provide a convenient spacer and holder for the individual heating-pipes of a heating system.

It has been made and adapted especially for use in lumber-driers and other driers where lengthy heating-pipes are employed in double layers.

One feature of the invention consists in providing a spacer and holder that will hold two series of pipes, a lower and an upper series, and preferably in such position that the upper pipes will not be over the lower pipes, but the pipes of the two series will alternate. The arrangement is also such that the pipes will lie loosely in the holder, and therefore with this construction the pipes in driers and other places where long pipes are used may be separately lifted or moved to some extent with relation to the spreader and holder, so that any pipe may be gotten at and placed in position for repairing or the like. This is the chief object and advantage of the invention. The device also permits longitudinal creeping of the pipes during expansion and contraction. These and the other features of the invention will be understood from the accompanying drawings and the following description and claims.

Figure 3:
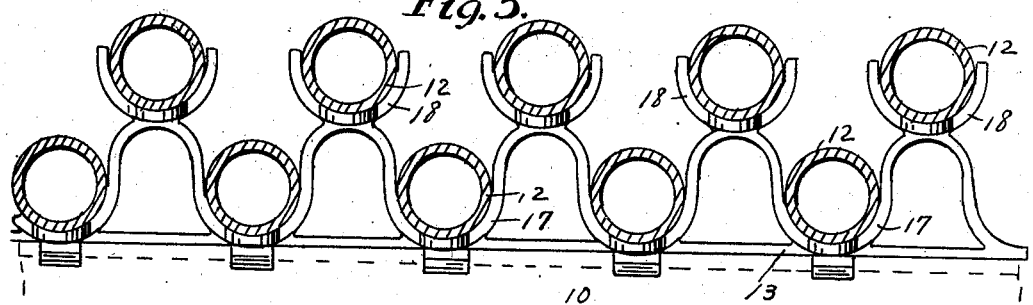
Figure 4:
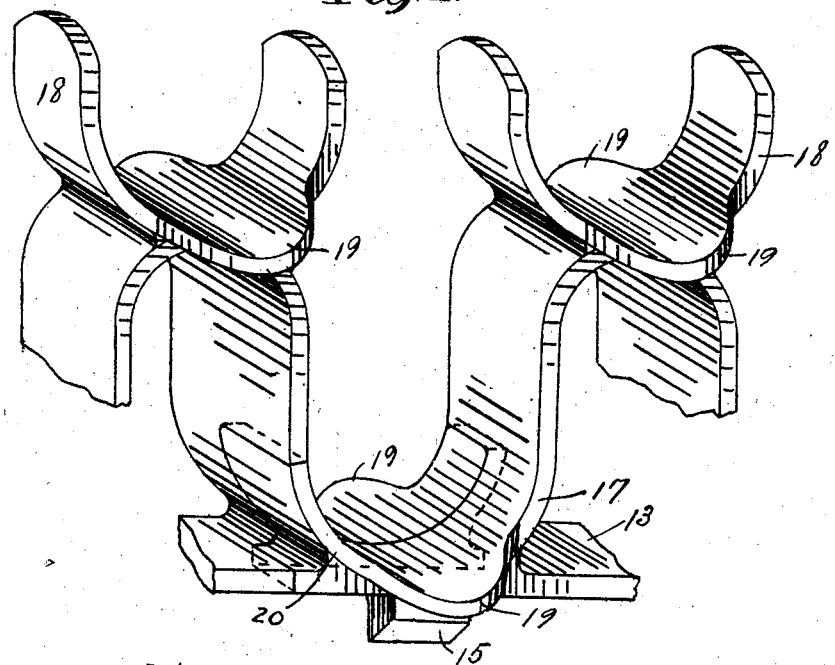
Figure 5:
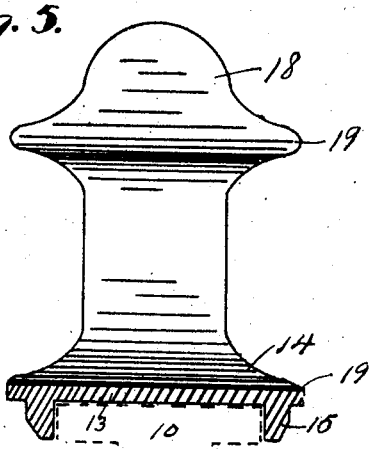

In the drawings, Figure 1 is a side view of a series of pipes mounted on my spreader and holder, one pipe being shown elevated in the middle and the pipes being broken away at the ends. Fig. 2 is a perspective view of a portion of the pipes and support, parts being broken and cut away. Fig. 3 is a side elevation of the spacer and holder with the pipes in place and shown in cross-section. Fig. 4 is a perspective view of the adjacent ends of two sections of the spacer and holder, showing them side-lapping. Fig. 5 is a transverse section through a spacer, the upper portion thereof being in elevation.

In detail, 10 represents a transverse channel-bar supported by brackets 11, secured to uprights 22. In a lumber-drier there is a number of the uprights 22 and cross-bars 10, and upon these cross-bars 10 it is desirable to mount a series of heating-pipes 12. These are quite long in lumber-driers—say seventy or eighty feet in length. The spacer and holder for said pipes consists of a base-plate 13 of substantially the width of the top of the bar 10 and adapted to rest longitudinally thereon. Along each side it has laterally-extending ears 14, from which lugs 15 extend downward, as shown in Fig. 5. These lugs on each side are placed three or four inches apart, so that the spacer may be placed upon or be longitudinally-slidable upon the bar 10. It is left loose thereon. Upon the plate 13 a series of stands 17 is secured, the lower part of the series being when taken together serpentine in side elevation, substantially as shown in Fig. 3. Between the adjacent stands there is a space left for receiving and holding the pipe 12, and upon each stand there is a semicircular pipe-holder 18. The semicircular pipe-holder 18 and the stands, the plate 13, the lugs 15, and, in fact, all parts of the spacer are cast integral. Therefore the parts marked 18 hold the upper series of pipes 12 so that the upper pipes are not over the lower pipes and there is ample opportunity for the circulation of air between said pipes and the escape of the heat.

The width of the holder under the pipes is sufficient, as compared with the length of the hold, to prevent tipping of the holder during the expansion and contraction of the pipes. To accomplish this end, the lower part of the upper semicircular pipe-holders 18 have laterally-extending ears 19. It is observed that the lower pipes rest closely upon the base-plate 13, and therefore near the bar 10, and the upper pipe-holders 18 are not far removed from the base-plate 13. The nearness of the pipe-holding bearings to the base-plate 13, as well as their relatively great width, coöperate to prevent the rocking or displacing of the spacer and pipe-holder. These spacers have their ends so formed that they may be joined together in series when necessary to use more than one spacer to hold the desired number of pipes. To accomplish that object, the sections, as shown in Fig. 4, have side-lapping ends 20, which have semicircular bearing-surfaces to support a pipe. All that is necessary, therefore, is to place these spacers adjacent each other upon the bar 10 with the ends 20 side-lapping and place a pipe upon the side-lapping ends. This pipe will hold the sections together, and all the other pipes when in place will help in accomplishing the same object. This makes a very firm union and yet without providing locking or connecting means on the spacers themselves.

From the foregoing it is seen that the whole body of pipes supported by a spacer or a number of spacer-sections on a beam may be moved laterally by merely sliding the spacer upon the beam. Likewise, any one of the pipes is readily accessible. This is illustrated in Figs. 1 and 2. Any pipe can be lifted up in the middle or along its length sufficiently far to enable the workman to work upon it, repair it, and replace it. As seen in Fig. 2, by lifting one top pipe over upon a lower pipe and the adjacent top pipe in the other direction upon a lower pipe the lower pipe between said removed pipes can be readily reached and lifted up and placed upon a crosspiece, where it will be held during its repair. This upward lifting of the pipe is shown in Fig. 1.

What I claim as my invention, and desire to secure by Letters Patent, is—

1. The combination with heating-pipes and a bar for supporting the same, of a spacer consisting of a base-plate resting on said bar, means thereon for holding the pipes, and lugs extending downward on each side of said supporting-bar.

2. The combination with heating-pipes and a bar for supporting the same, of a spacer consisting of a plate adapted to rest upon said bar, lugs extending downward therefrom on each side of said bar, and pipe-holders on said plate with the parts thereof under the pipe wider than said plate, whereby the creeping of the pipes will not tilt or dislocate the spacer.

3. The combination with heating-pipes and a bar for supporting the same, of a spacer consisting of a plate adapted to rest upon said bar, a series of pipe-holding stands secured thereto the adjacent stands being spaced apart and forming pipe-holders therebetween and a pipe-holder upon each stand, whereby it will support an upper and a lower series of pipes and the pipes of the two series will all be in different vertical planes.

4. The combination with heating-pipes and a bar for supporting the same, of means for spacing and holding the pipes consisting of a plurality of sections, the adjacent ends of which side lap and have a pipe-bearing so that a pipe resting upon said side-lapping ends will hold the sections together.

In witness whereof I have hereunto affixed my signature in the presence of the witnesses herein named.

WILLIAM P. HUSSEY.

Witnesses:
FRANK J. LAHR,
V. H. LOCKWOOD.